United States Patent
Brunin et al.

(10) Patent No.: US 9,374,252 B2
(45) Date of Patent: Jun. 21, 2016

(54) GENERATING PARALLEL BINARY REPRESENTATION OF HDBASET PHYSICAL MODULATION

(71) Applicant: Valens Semiconductor Ltd., Hod Hasharon (IL)

(72) Inventors: Zeev Brunin, Hod Hasharon (IL); Itamar Nizan, Ness-Ziona (IL); Alon Benzaray, Herzeliya (IL); Eyran Lida, Krar Ha-Oranim (IL)

(73) Assignee: Valens Semiconductor Ltd., Hod Hasharon (IL)

( * ) Notice: Subject to any disclaimer, the term of this patent is extended or adjusted under 35 U.S.C. 154(b) by 53 days.

(21) Appl. No.: 14/338,548

(22) Filed: Jul. 23, 2014

(65) Prior Publication Data

US 2016/0028567 A1 Jan. 28, 2016

(51) Int. Cl.
*H04L 25/49* (2006.01)

(52) U.S. Cl.
CPC ........ *H04L 25/4906* (2013.01); *H04L 25/4917* (2013.01)

(58) Field of Classification Search
None
See application file for complete search history.

(56) References Cited

U.S. PATENT DOCUMENTS

| | | | |
|---|---|---|---|
| 4,337,457 A | 6/1982 | Tache | |
| 5,291,487 A | 3/1994 | Sheppard | |
| 5,384,775 A | 1/1995 | Sheppard | |
| 5,640,605 A | 6/1997 | Johnson et al. | |
| 5,784,293 A | 7/1998 | Lipa | |
| 6,000,054 A | 12/1999 | Bahr et al. | |
| 6,510,173 B1 | 1/2003 | Garmonov et al. | |
| 6,543,021 B1 | 4/2003 | Piret | |
| 7,173,979 B1 | 2/2007 | Badri et al. | |
| 7,290,927 B2 | 11/2007 | Mantelet et al. | |
| 7,523,382 B2 * | 4/2009 | Kim | H03M 13/271 714/755 |
| 7,835,289 B2 | 11/2010 | Lida et al. | |
| 8,170,153 B2 | 5/2012 | Kwak et al. | |
| 8,386,880 B2 | 2/2013 | Savin | |
| 8,526,462 B2 | 9/2013 | Lida | |
| 8,565,337 B2 | 10/2013 | Lida et al. | |
| 2005/0160347 A1 | 7/2005 | Kim et al. | |
| 2006/0056538 A1 | 3/2006 | Nam et al. | |
| 2008/0043871 A1 | 2/2008 | Latouche et al. | |
| 2014/0016034 A1 * | 1/2014 | Cirstea | H04N 7/108 348/460 |

* cited by examiner

*Primary Examiner* — Afshawn Towfighi
(74) *Attorney, Agent, or Firm* — Active Knowledge Ltd.

(57) ABSTRACT

Method and devices for generating a parallel binary representation of an HDBaseT® physical modulation. The method and devices include generating series-consisting-4-binary-symbols, each represents a physical modulation of one HDBaseT compliant symbol. The series-consisting-4-binary-symbols are transmitted over eight binary channels, where each series-consisting-4-binary-symbols is transmitted serially over one of the binary channels using transmission rate that is twice the HDBaseT rate.

20 Claims, 5 Drawing Sheets

GENERATING PARALLEL BINARY REPRESENTATION OF HDBASET PHYSICAL MODULATION

BACKGROUND

Multi-level modulation provides lower error resistance than binary modulation (two level modulation), therefore it is common to apply error correction codes to multi-level modulations over noisy channels. Due to the overheads allocated to error correction and other considerations, it is uncommon to apply one to one conversion of multi-level modulation to binary modulation. However, this is not necessarily the case in HDBaseT® standard (version 1.0, version 2.0, and future HDBaseT standards).

HDBaseT 1.0 uses an asymmetric method, sending video, audio, Ethernet and controls from source to sink, and back channel from sink to source. The asymmetric nature of HDBaseT is based on an innovative DSP engine, Application Front End architecture, and a special line coding scheme that provides a better transfer quality to selective data types (such as audio, controls, and Ethernet).

HDBaseT uses 16-level Pulse Amplitude Modulation (PAM16) and subsets of the PAM16, where digital data is represented as a coding scheme using different voltage levels at high rates. This enables HDBaseT to transmit one or more high definition video and audio streams over a single 100 m category 5 or category 6 cable.

SUMMARY

A first general aspect includes a device configured to generate a parallel binary representation of an HDBaseT physical modulation, including: a binary encoder configured to receive data and generate series-including-4-binary-symbols; where each series-including-4-binary-symbols represents a physical modulation of one HDBaseT compliant symbol; where an HDBaseT compliant symbol is modulated according to a 16-level pulse amplitude modulation (PAM16), or subsets of the PAM16, and each series-including-4-binary-symbols is a 4-bit code of the level used in the HDBaseT compliant symbol; and a transmitter configured to transmit two series-including-4-binary-symbols in parallel over two binary channels, such that each series-including-4-binary-symbols is transmitted serially over one of the two binary channels; where the two series-including-4-binary-symbols represent physical modulations of two HDBaseT compliant symbols that would have been transmitted consecutively at a first symbol rate over a single twisted pair, had the single twisted pair been included in an HDBaseT compliant interface; where the transmitter is configured to transmit the series-including-4-binary-symbols at a second rate that is twice the first symbol rate.

Implementations of the first general aspect may include one or more of the following features. The device where the transmitter is further configured to transmit six additional series-including-4-binary-symbols in parallel over six additional binary channels; where the six additional series-including-4-binary-symbols represent physical modulations of six additional HDBaseT compliant symbols that would have been transmitted consecutively at the first symbol rate over three additional twisted pairs (e.g., two consecutive symbols per twisted pair), had the twisted pairs been included in HDBaseT compliant interface. The device where the two binary channels and the six additional binary channels are included in a parallel chip-to-chip binary interface, and the parallel chip-to-chip binary interface further includes a ready signal channel. The device where the transmitter is further configured to align the eight binary channels using an alignment pattern. The device where at a startup stage, the transmitter is further configured to wait for assertion and deassertion of the ready signal channel, and then to transmit an alignment sequence on all the eight binary channels. The device where the transmitter is further configured to transmit two additional series-including-4-binary-symbols in parallel over two additional binary channels; where the two additional series-including-4-binary-symbols represent physical modulations of two additional HDBaseT compliant symbols that would have been transmitted consecutively at the first symbol rate over one additional twisted pair, had the interface been an HDBaseT compliant interface that transmits over 2 of the 4 twisted pairs of a category 5 or category 6 cables. The device where the two binary channels and the two additional binary channels are included in a parallel chip-to-chip binary interface, and the parallel chip-to-chip binary interface further includes a ready signal channel. The device where the transmitter is further configured to align the four binary channels using an alignment pattern. The device where the first symbol rate is determined according to the HDBaseT standard to be essentially 500 Mb/s.

A second general aspect includes a method for generating a parallel binary representation of an HDBaseT physical modulation, including: receiving data and generating series-including-4-binary-symbols, each series-including-4-binary-symbols represents a physical modulation of one HDBaseT compliant symbol; where an HDBaseT compliant symbol is modulated according to a 16-level pulse amplitude modulation (PAM16), or subsets of the PAM16, and each series-including-4-binary-symbols is a 4-bit code of the level used in the HDBaseT compliant symbol; and transmitting two series-including-4-binary-symbols in parallel over two binary channels, such that each series-including-4-binary-symbols is transmitted serially over one of the two binary channels; where the two series-including-4-binary-symbols represent physical modulations of two HDBaseT compliant symbols that would have been transmitted consecutively at a first symbol rate over a single twisted pair, had the single twisted pair been included in an HDBaseT compliant interface; where the series-including-4-binary-symbols are transmitted at a second rate that is twice the first symbol rate.

Implementations of the second general aspect may include one or more of the following features. The method further including transmitting six additional series-including-4-binary-symbols in parallel over six additional binary channels; where the six additional series-including-4-binary-symbols represent physical modulations of six additional HDBaseT compliant symbols that would have been transmitted consecutively at the first symbol rate over three additional twisted pairs, had the twisted pairs been included in an HDBaseT compliant interface. The method where the two binary channels and the six additional binary channels are included in a parallel chip-to-chip binary interface, the parallel chip-to-chip binary interface further includes a ready signal channel, and further including aligning the eight binary channels using an alignment pattern. The method further including waiting, at startup stage, for assertion and deassertion of the ready signal channel, and then transmitting an alignment sequence on all the eight binary channels. The method further including transmitting two additional series-including-4-binary-symbols in parallel over two additional binary channels; where the two additional series-including-4-binary-symbols represent physical modulations of two additional HDBaseT compliant symbols that would have been transmitted consecutively at the first symbol rate over one additional twisted pair, had the twisted pairs been included in an HDBaseT compliant interface that transmits over 2 of the 4 twisted pairs of a category 5 or category 6 cables. The method where the two binary channels and the two additional binary channels are included in a parallel chip-to-chip binary interface, and the parallel chip-to-chip binary interface further includes a ready signal channel; and further including aligning the four binary channels using an alignment pattern. The method where the first symbol rate is determined according to the HDBaseT standard to be essentially 500 Mb/s.

A third general aspect includes a method for parallelizing an HDBaseT communication over a parallel chip-to-chip binary interface, including: receiving an HDBaseT stream including four parallel HDBaseT compliant 4-bit-codes; where the HDBaseT stream is designed to be transmitted over 4 twisted pair HDBaseT channels; converting each HDBaseT compliant 4-bit-code into a series-of-4-binary-symbols; where each of the series-of-4-binary-symbols represents an HDBaseT compliant 4-bit-code; and transmitting eight instances of the series-of-4-binary-symbols over the parallel chip-to-chip binary interface; where the parallel chip-to-chip binary interface includes eight binary channels, each series-of-4-binary-symbols is transmitted serially over one of the eight binary channels, and each of the eight binary channels operates at a rate double than rate of the HDBaseT channels.

Implementations of the third general aspect may include one or more of the following features. The method where the rate of the HDBaseT channels is determined according to the HDBaseT standard to be essentially 500 Mb/s. The method where the parallel chip-to-chip binary interface further includes a ready signal channel, and further including aligning the eight binary channels using an alignment pattern. The method further including waiting, at startup stage, for assertion and deassertion of the ready signal channel, and then transmitting an alignment sequence on all the eight binary channels.

A fourth general aspect includes a parallel chip-to-chip binary interface for HDBaseT communication, including: a processor configured to receive an HDBaseT stream including four parallel HDBaseT compliant 4-bit-codes; where the HDBaseT stream is designed to be transmitted over 4 twisted pair HDBaseT channels; the processor is further configured to convert each HDBaseT compliant 4-bit-code into a series-of-4-binary-symbols; where each of the series-of-4-binary-symbols represents an HDBaseT compliant 4-bit-code; and a transmitter configured to transmit eight instances of the series-of-4-binary-symbols over the parallel chip-to-chip binary interface; where the parallel chip-to-chip binary interface includes eight binary channels, each series-of-4-binary-symbols is transmitted serially over one of the eight binary channels, and each of the eight binary channel operates at a rate double the rate of the HDBaseT channels.

BRIEF DESCRIPTION OF THE DRAWINGS

The embodiments are herein described, by way of example only, with reference to the accompanying drawings. In the drawings.

DETAILED DESCRIPTION

Figure 1:
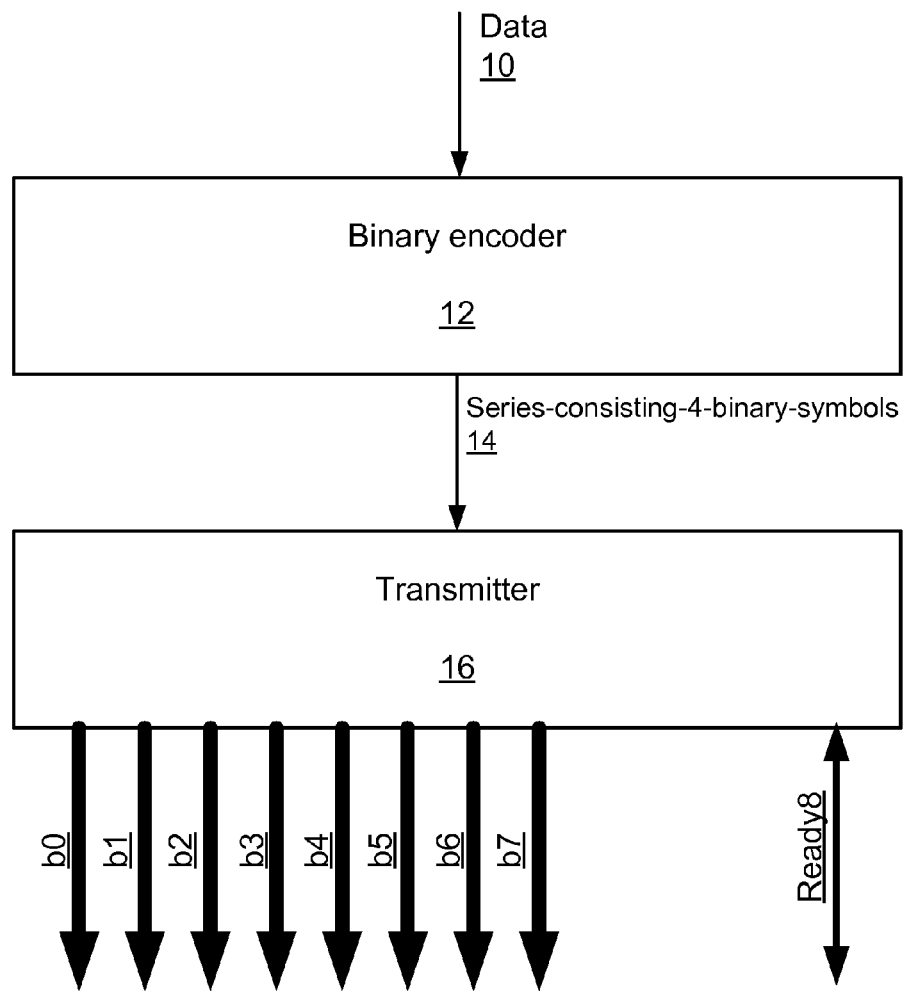
FIG. 1 illustrates one embodiment of a device configured to generate a parallel binary representation of an HDBaseT® physical modulation.

FIG. 1 illustrates one embodiment of a device configured to generate a parallel binary representation of an HDBaseT® physical modulation. The device includes a binary encoder 12 and a transmitter 16.

The binary encoder 12 receives data 10 and generates series-consisting-4-binary-symbols 14. Each series-consisting-4-binary-symbols 14 represents a physical modulation of one HDBaseT compliant symbol. In one embodiment, an HDBaseT compliant symbol is modulated according to a 16-level Pulse Amplitude Modulation (PAM16), or subsets of the PAM16, and each series-consisting-4-binary-symbols is a 4-bit code of the level used in the HDBaseT compliant symbol. For example, PAM16 level 1 may be represented by [0,0,0,0], PAM16 level 2 may be represented by [1,0,0,0], and PAM16 level 16 may be represented by [1,1,1,1]. The binary representation of the PAM16 level is a one to one conversion that does not add overhead.

The transmitter 16 transmits the series-consisting-4-binary-symbols 14, which were generated by the binary encoder 12, over binary channels b0, b1, b2, b3, b4, b5, b6, b7. Each series-consisting-4-binary-symbols 14 is transmitted serially over one of the binary channels b0-b7. In one embodiment, the rate of the binary channels b0-b7 is approximately 1 Gb/s, which is twice the rate of each of the four standard HDBaseT channels, and thus the total throughput of the eight 1 Gb/s binary channels essentially equals the total throughput of the four standard HDBaseT channels. In another embodiment, the rate of the four standard HDBaseT channels is higher than 500 mb/s, and the rate of the eight binary channels is increased proportionally to provide essentially the same total throughput.

Figure 2:
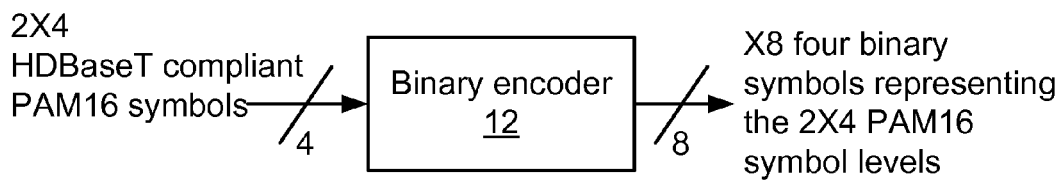
FIG. 2 illustrates one embodiment where eight series-consisting-4-binary-symbols are transmitted in parallel over binary channels and represent physical modulations of eight HDBaseT compliant symbols.

In one embodiment, each series-consisting-4-binary-symbols represents a physical modulation of one HDBaseT compliant symbol, that would have been transmitted consecutively at a first symbol rate over a single twisted pair, had the single twisted pair been included in an HDBaseT compliant interface. FIG. 2 illustrates one embodiment where the eight series-consisting-4-binary-symbols that are transmitted in parallel over the binary channels b0-b7 represent physical modulations of eight HDBaseT compliant symbols. Note that the eight series-consisting-4-binary-symbols would have been transmitted consecutively on two HDBaseT symbol cycles, had the eight HDBaseT compliant symbols been received from an HDBaseT compliant interface. In this embodiment, each HDBaseT symbol cycle conveys four PAM16 symbols in parallel over the four HDBaseT twisted pairs channels.

Optionally, the transmitter may transmit the series-consisting-4-binary-symbols over a subset of the binary channels. For example, when the series-consisting-4-binary-symbols represent physical modulations of just four HDBaseT compliant symbols that would have been transmitted consecutively at the first symbol rate over two out of the four twisted pairs, had the twisted pairs been included in HDBaseT compliant interface, then the transmitter may transmit over just four of the binary channels.

Figure 3:
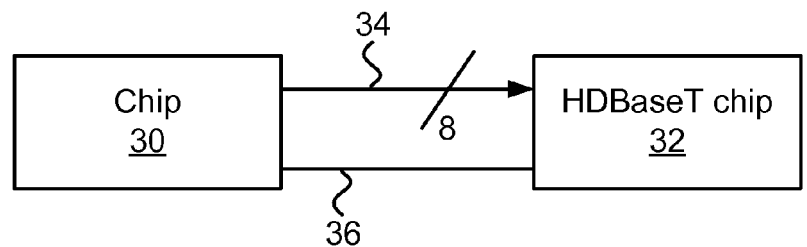
FIG. 3 illustrates one embodiment of binary channels that are included in a parallel chip-to-chip binary interface.

FIG. 3 illustrates one embodiment where the binary channels are included in a parallel chip-to-chip binary interface 34, which connects chip 30 to HDBaseT chip 32. The parallel chip-to-chip binary interface 34 may also include a ready signal channel 36 (also denoted as Ready8 in FIG. 1). Optionally, the transmitter is configured to align the eight binary channels using an alignment pattern. In one embodiment, at a startup stage, the transmitter is further configured to wait for assertion and deassertion of the ready signal channel, and then to transmit an alignment sequence on all the eight binary channels.

The alignment process may include the steps of finding the transmitted words (character alignment), and then channel deskewing between the binary channels to find the correct order of the transmitted words. In one example, pulling down the ready signal triggers the alignment process. When the ready signal is up, the transmitter starts transmitting a training sequence representing the physical modulations of the HDBaseT compliant symbols, such as representations of voltage levels of the PAM16 symbols belonging to the HDBaseT symbols.

In one embodiment, Chip 30 and HDBaseT chip 32 include essentially the same Physical Coding Sublayer (PCS). It is noted that PCS refers to a sub-layer of layer 1 of the seven-layer OSI model, and two PCSs are considered essentially the same when both of them can be aligned using the same training sequence.

Figure 4:
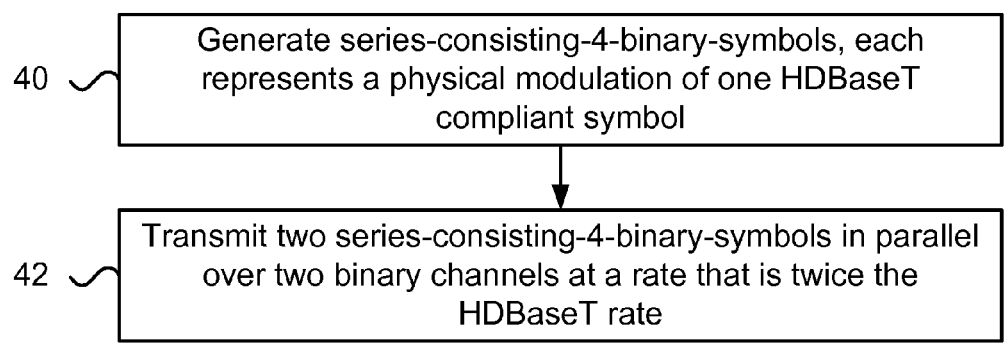
FIG. 4 illustrates one embodiment of a method for generating a parallel binary representation of an HDBaseT® physical modulation.

FIG. 4 illustrates one embodiment of a method for generating a parallel binary representation of an HDBaseT® physical modulation. The method includes the following steps:

In step 40, receiving data and generating series-consisting-4-binary-symbols, each series-consisting-4-binary-symbols represents a physical modulation of one HDBaseT compliant symbol. In one embodiment, an HDBaseT compliant symbol is modulated according to a 16-level pulse amplitude modulation (PAM16), or subsets of the PAM16, and each series-consisting-4-binary-symbols is a 4-bit code of the level used in the HDBaseT compliant symbol.

And in step 42, transmitting two series-consisting-4-binary-symbols in parallel over two binary channels, such that each series-consisting-4-binary-symbols is transmitted serially over one of the two binary channels. The two series-consisting-4-binary-symbols represent physical modulations of two HDBaseT compliant symbols that would have been transmitted consecutively at a first symbol rate over a single twisted pair, had the single twisted pair been included in an HDBaseT compliant interface. Optionally, the first symbol rate is determined according to the HDBaseT® standard to be essentially 500 Mb/s, and the series-consisting-4-binary-symbols are transmitted at a second rate that is twice the first symbol rate over two binary channels, in order to support the required bandwidth.

In one embodiment, the method described in FIG. 4 further includes an additional step of transmitting six additional series-consisting-4-binary-symbols in parallel over six additional binary channels. The six additional series-consisting-4-binary-symbols represent physical modulations of six additional HDBaseT compliant symbols that would have been transmitted consecutively at the first symbol rate over three additional twisted pairs (e.g., two consecutive symbols per each of the additional twisted pairs), had the twisted pairs been included in an HDBaseT compliant interface. Optionally, the two binary channels and the six additional binary channels are included in a parallel chip-to-chip binary interface. The parallel chip-to-chip binary interface may further include a ready signal channel. The method may include an additional step of aligning the eight binary channels using an alignment pattern. Optionally, the method further includes the step of waiting, at startup stage, for assertion and deassertion of the ready signal channel, and then transmitting an alignment sequence on all the eight binary channels.

In one embodiment, the method described in FIG. 4 further includes an additional step of transmitting two additional series-consisting-4-binary-symbols in parallel over two additional binary channels. The two additional series-consisting-4-binary-symbols represent physical modulations of two additional HDBaseT compliant symbols that would have been transmitted consecutively at the first symbol rate over one additional twisted pair, had the twisted pairs been included in an HDBaseT compliant interface that transmits over 2 of the 4 twisted pairs of a category 5 or category 6 cables. Optionally, the two binary channels and the two additional binary channels are included in a parallel chip-to-chip binary interface, and the parallel chip-to-chip binary interface further includes a ready signal channel. Optionally, the four binary channels are aligned using an alignment pattern.

Figure 5:
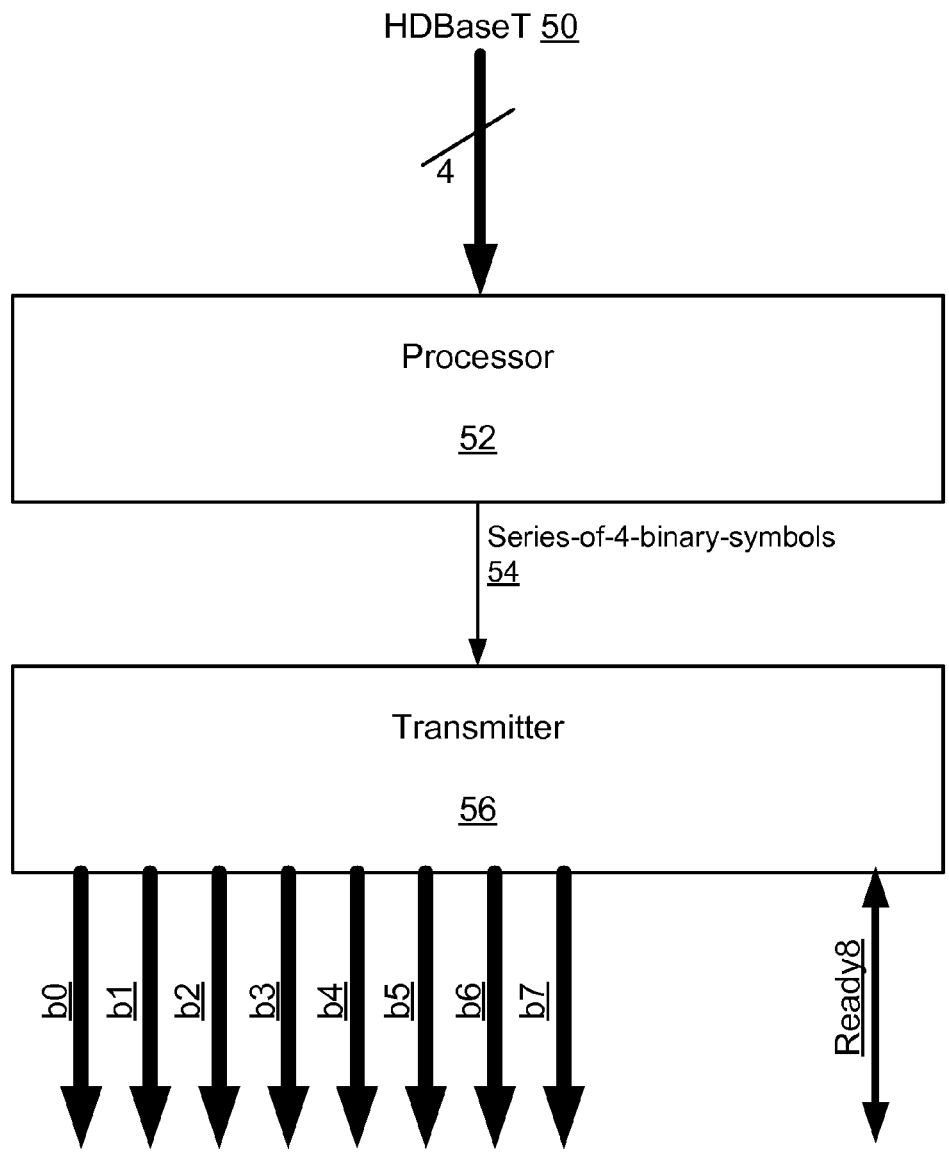
FIG. 5 illustrates one embodiment of a parallel chip-to-chip binary interface for HDBaseT® communication.

FIG. 5 illustrates one embodiment of a parallel chip-to-chip binary interface for HDBaseT® communication, including a processor 52 and a transmitter 56.

The processor 52 receives an HDBaseT stream 50 that includes four parallel HDBaseT compliant 4-bit-codes. Optionally, the HDBaseT stream is designed to be transmitted over 4 twisted pair HDBaseT channels. The processor 52 converts each HDBaseT compliant 4-bit-code into a series-of-4-binary-symbols 54, with each of the series-of-4-binary-symbols representing an HDBaseT compliant 4-bit-code.

The transmitter 56 transmits eight instances of the series-of-4-binary-symbols over the parallel chip-to-chip binary interface b0-b7. The parallel chip-to-chip binary interface includes eight binary channels b0-b7, each series-of-4-binary-symbols is transmitted serially over one of the eight binary channels, and each of the eight binary channel operates at a rate double the rate of the HDBaseT channels. The chip-to-chip interface may also include a ready signal Ready8, and optionally there may be additional connections.

Figure 6:
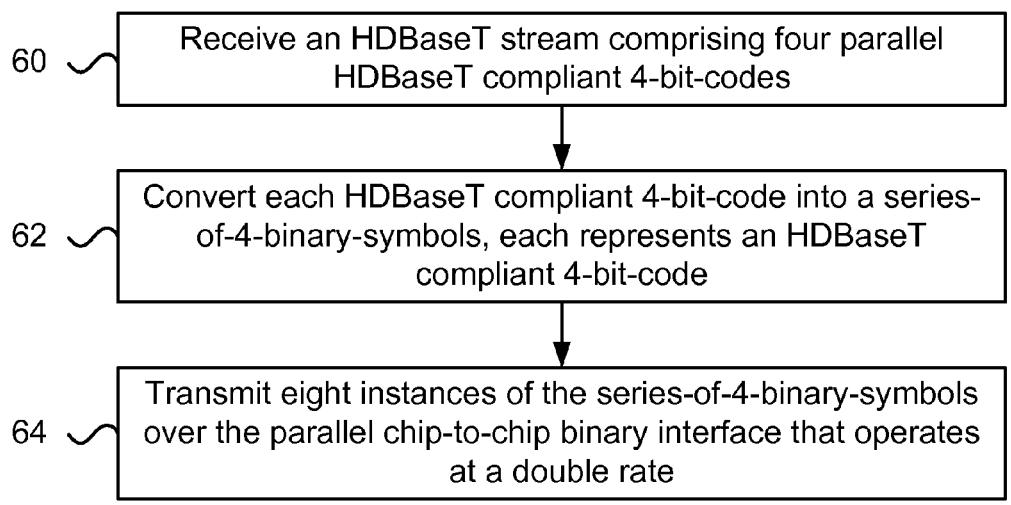
FIG. 6 illustrates one embodiment of a method for parallelizing an HDBaseT® communication over a parallel chip-to-chip binary interface.

FIG. 6 illustrates one embodiment of a method for parallelizing an HDBaseT® communication over a parallel chip-to-chip binary interface. The method includes the following steps:

In step 60, receiving an HDBaseT stream comprising four parallel HDBaseT compliant 4-bit-codes. Optionally, the HDBaseT stream is designed to be transmitted over 4 twisted pair HDBaseT channels.

In step 62, converting each HDBaseT compliant 4-bit-code into a series-of-4-binary-symbols; each of the series-of-4-binary-symbols representing an HDBaseT compliant 4-bit-code.

And in step 64, transmitting eight instances of the series-of-4-binary-symbols over the parallel chip-to-chip binary interface. Optionally, the parallel chip-to-chip binary interface includes eight binary channels, each series-of-4-binary-symbols is transmitted serially over one of the eight binary channels, and each of the eight binary channels operates at a rate double than rate of the HDBaseT channels.

In one embodiment, the method described in FIG. 6 further includes waiting, at startup stage, for assertion and deassertion of the ready signal channel, and then transmitting an alignment sequence on all of the eight binary channels. In another embodiment, the first symbol rate is determined according to the HDBaseT® standard to be essentially 500 Mb/s. And in still another embodiment, the parallel chip-to-chip binary interface also includes a ready signal channel. Optionally, the method also involves aligning the eight binary channels using an alignment pattern.

In this description, references to "one embodiment" mean that the feature being referred to may be included in at least one embodiment of the invention. Moreover, separate references to "one embodiment" or "some embodiments" in this description do not necessarily refer to the same embodiment. Additionally, references to "one embodiment" and "another embodiment" may not necessarily refer to different embodiments, but may be terms used, at times, to illustrate different aspects of an embodiment.

The embodiments of the invention may include any variety of combinations and/or integrations of the features of the embodiments described herein. Although some embodiments may depict serial operations, the embodiments may perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. The embodiments are not limited in their applications to the details of the order or sequence of steps of operation of methods, or to details of implementation of devices, set in the description, drawings, or examples. Moreover, individual blocks illustrated in the figures may be functional in nature and therefore may not necessarily correspond to discrete hardware elements.

While the methods disclosed herein have been described and shown with reference to particular steps performed in a particular order, it is understood that these steps may be combined, sub-divided, and/or reordered to form an equivalent method without departing from the teachings of the embodiments. Accordingly, unless specifically indicated herein, the order and grouping of the steps is not a limitation of the embodiments. Furthermore, methods and mechanisms of the embodiments will sometimes be described in singular form for clarity. However, some embodiments may include multiple iterations of a method or multiple instantiations of a mechanism unless noted otherwise. For example, when a processor is disclosed in one embodiment, the scope of the embodiment is intended to also cover the use of multiple processors. Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications, and variations will be apparent to those skilled in the art. It is to be understood that other embodiments may be utilized and structural changes may be made without departing from the scope of the embodiments. Accordingly, this disclosure is intended to embrace all such alternatives, modifications, and variations that fall within the spirit and scope of the appended claims and their equivalents.

What is claimed is:

1. A device configured to generate a parallel binary representation of a 16-level pulse amplitude modulation (PAM16), comprising:
    a binary encoder configured to receive data and generate series-consisting-4-binary-symbols; wherein a series-consisting-4-binary-symbols represents a physical modulation of one HDBaseT compliant symbol, and the series-consisting-4-binary-symbols consists of a 4-bit code of the level used in the HDBaseT compliant symbol; and
    a transmitter configured to transmit first and second series-consisting-4-binary-symbols in parallel over two binary channels, such that each series-consisting-4-binary-symbols is transmitted serially over one of the two binary channels; wherein the first and second series-consisting-4-binary-symbols represent physical modulations of first and second HDBaseT compliant symbols that would have been transmitted consecutively at a first symbol rate over a single twisted pair, had the single twisted pair been comprised in an HDBaseT compliant interface;
    wherein the transmitter is configured to transmit the series-consisting-4-binary-symbols at a second rate that is twice the first symbol rate.

2. The device of claim 1, wherein the transmitter is further configured to transmit six additional series-consisting-4-binary-symbols in parallel over six additional binary channels; wherein the six additional series-consisting-4-binary-symbols represent physical modulations of six additional HDBaseT compliant symbols that would have been transmitted consecutively at the first symbol rate over three additional twisted pairs, had the twisted pairs been comprised in HDBaseT compliant interface.

3. The device of claim 2, wherein the two binary channels and the six additional binary channels are comprised in a parallel chip-to-chip binary interface, and the parallel chip-to-chip binary interface further comprises a ready signal channel.

4. The device of claim 3, wherein the transmitter is further configured to align the eight binary channels using an alignment pattern.

5. The device of claim 3, wherein at a startup stage, the transmitter is further configured to wait for assertion and deassertion of the ready signal channel, and then to transmit an alignment sequence on all the eight binary channels.

6. The device of claim 1, wherein the transmitter is further configured to transmit two additional series-consisting-4-binary-symbols in parallel over two additional binary channels; wherein the two additional series-consisting-4-binary-symbols represent physical modulations of two additional HDBaseT compliant symbols that would have been transmitted consecutively at the first symbol rate over one additional twisted pair, had the interface been an HDBaseT compliant interface that transmits over 2 of the 4 twisted pairs of a category 5 or category 6 cables.

7. The device of claim 6, wherein the two binary channels and the two additional binary channels are comprised in a parallel chip-to-chip binary interface, and the parallel chip-to-chip binary interface further comprises a ready signal channel.

8. The device of claim 7, wherein the transmitter is further configured to align the four binary channels using an alignment pattern.

9. The device of claim 1, wherein the first symbol rate is determined according to the HDBaseT® standard to be essentially 500 Mb/s.

10. A method for generating a parallel binary representation of a 16-level pulse amplitude modulation (PAM16), comprising:
    receiving data and generating series-consisting-4-binary-symbols; wherein a series-consisting-4-binary-symbols represents a physical modulation of one HDBaseT compliant symbol, and the series-consisting-4-binary-symbols consists of a 4-bit code of the level used in the HDBaseT compliant symbol; and
    transmitting first and second series-consisting-4-binary-symbols in parallel over two binary channels, such that each series-consisting-4-binary-symbols is transmitted serially over one of the two binary channels; wherein the first and second series-consisting-4-binary-symbols represent physical modulations of two HDBaseT compliant symbols that would have been transmitted consecutively at a first symbol rate over a single twisted pair, had the single twisted pair been comprised in an HDBaseT compliant interface;

wherein the series-consisting-4-binary-symbols are transmitted at a second rate that is twice the first symbol rate.

11. The method of claim 10, further comprising transmitting six additional series-consisting-4-binary-symbols in parallel over six additional binary channels; wherein the six additional series-consisting-4-binary-symbols represent physical modulations of six additional HDBaseT compliant symbols that would have been transmitted consecutively at the first symbol rate over three additional twisted pairs, had the twisted pairs been comprised in an HDBaseT compliant interface.

12. The method of claim 11, wherein the two binary channels and the six additional binary channels are comprised in a parallel chip-to-chip binary interface, the parallel chip-to-chip binary interface further comprises a ready signal channel, and further comprising aligning the eight binary channels using an alignment pattern.

13. The method of claim 11, wherein the two binary channels and the six additional binary channels are comprised in a parallel chip-to-chip binary interface, the parallel chip-to-chip binary interface further comprises a ready signal channel, and further comprising waiting, at startup stage, for assertion and deassertion of the ready signal channel, and then transmitting an alignment sequence on all the eight binary channels.

14. The method of claim 10, further comprising transmitting two additional series-consisting-4-binary-symbols in parallel over two additional binary channels; wherein the two additional series-consisting-4-binary-symbols represent physical modulations of two additional HDBaseT compliant symbols that would have been transmitted consecutively at the first symbol rate over one additional twisted pair, had the twisted pairs been comprised in an HDBaseT compliant interface that transmits over 2 of the 4 twisted pairs of a category 5 or category 6 cables.

15. The method of claim 14, wherein the two binary channels and the two additional binary channels are comprised in a parallel chip-to-chip binary interface, and the parallel chip-to-chip binary interface further comprises a ready signal channel; and further comprising aligning the four binary channels using an alignment pattern.

16. The method of claim 10, wherein the first symbol rate is determined according to the HDBaseT® standard to be essentially 500 Mb/s.

17. A method for parallelizing a 16-level pulse amplitude modulation (PAM16) communication over a parallel chip-to-chip binary interface, comprising:

receiving an HDBaseT stream comprising four parallel HDBaseT compliant 4-bit-codes; wherein the HDBaseT stream is designed to be transmitted over 4 twisted pair HDBaseT channels;

converting each HDBaseT compliant 4-bit-code into a series-of-4-binary-symbols; wherein each of the series-of-4-binary-symbols represents an HDBaseT compliant 4-bit-code; and transmitting eight instances of the series-of-4-binary-symbols over the parallel chip-to-chip binary interface; wherein the parallel chip-to-chip binary interface comprises eight binary channels, each series-of-4-binary-symbols is transmitted serially over one of the eight binary channels, and each of the eight binary channels operates at a rate double than rate of the HDBaseT channels.

18. The method of claim 17, wherein the rate of the HDBaseT channels is determined according to the HDBaseT® standard to be essentially 500 Mb/s.

19. The method of claim 17, wherein the parallel chip-to-chip binary interface further comprises a ready signal channel, and further comprising aligning the eight binary channels using an alignment pattern.

20. The method of claim 17, wherein the parallel chip-to-chip binary interface further comprises a ready signal channel, and further comprising waiting, at startup stage, for assertion and deassertion of the ready signal channel, and then transmitting an alignment sequence on all the eight binary channels.

* * * * *